(12) United States Patent
Ruettinger et al.

(10) Patent No.: US 7,357,911 B2
(45) Date of Patent: Apr. 15, 2008

(54) PROCESS CONDITIONS FOR PT-RE BIMETALLIC WATER GAS SHIFT CATALYSTS

(75) Inventors: Wolfgang Friedrich Ruettinger, East Windsor, NJ (US); Robert J. Farrauto, Princeton, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 15 days.

(21) Appl. No.: 11/303,369

(22) Filed: Dec. 16, 2005

(65) Prior Publication Data

US 2007/0140953 A1 Jun. 21, 2007

(51) Int. Cl.
*C01B 3/16* (2006.01)
(52) U.S. Cl. .................... 423/655; 423/656
(58) Field of Classification Search ............. 423/655, 423/656
See application file for complete search history.

(56) References Cited

U.S. PATENT DOCUMENTS

| | | | |
|---|---|---|---|
| 6,455,182 B1 * | 9/2002 | Silver | 429/17 |
| 6,777,117 B1 | 8/2004 | Igarashi et al. | |
| 2003/0186804 A1 | 10/2003 | Wagner et al. | |
| 2007/0183968 A1 * | 8/2007 | Healey et al. | 423/656 |

OTHER PUBLICATIONS

Choung, et al., "Pt-Re bimetallic supported on CeO2-ZrO2 mixed oxides as water-gas shift catalysts", Dec. 19, 2004, Catalysis Today 99 (2005) 257-262, www.elsevier.com/locate/catto.

* cited by examiner

*Primary Examiner*—Wayne A. Langel
(74) *Attorney, Agent, or Firm*—Raymond F. Keller; Melanie L. Brown; Brian W. Stegman

(57) ABSTRACT

Operating conditions for generating hydrogen by the water-gas shift reaction have been found which reduce the aging of Pt—Re bimetallic water-gas shift catalysts. The process parameters provide a stable operation in residential fuel processors and in hydrogen generators for on-site hydrogen generation.

20 Claims, 2 Drawing Sheets

PROCESS CONDITIONS FOR PT-RE BIMETALLIC WATER GAS SHIFT CATALYSTS

FIELD OF THE INVENTION

The present invention relates to optimized operating conditions for platinum (Pt)—rhenium (Re) bimetallic water gas shift catalysts to prolong the life of the catalysts.

BACKGROUND OF THE INVENTION

Fuel cells directly convert chemical energy into electricity thereby eliminating the mechanical process steps that limit thermodynamic efficiency, and have been proposed as a power source for many applications. The fuel cell can be two to three times as efficient as the internal combustion engine with little, if any, emission of primary pollutants such as carbon monoxide, hydrocarbons and NOx. Fuel cell-powered vehicles which reform hydrocarbons to power the fuel cell generate less carbon dioxide (green house gas) and have enhanced fuel efficiency.

Fuel cells, including PEM fuel cells [also called solid polymer electrolyte or (SPE) fuel cells], generate electrical power in a chemical reaction between a reducing agent (hydrogen) and an oxidizing agent (oxygen) which are fed to the fuel cells. A PEM fuel cell includes an anode and a cathode separated by a membrane which is usually an ion exchange resin membrane. The anode and cathode electrodes are typically constructed from finely divided carbon particles, catalytic particles supported on the carbon particles and proton conductive resin intermingled with the catalytic and carbon particles. In typical PEM fuel cell operation, hydrogen gas is electrolytically oxidized to hydrogen ions at the anode composed of platinum reaction catalysts deposited on a conductive carbon electrode. The protons pass through the ion exchange resin membrane, which can be a fluoropolymer of sulfonic acid called a proton exchange membrane. $H_2O$ is produced when protons then combine with oxygen that has been electrolytically reduced at the cathode. The electrons flow through an external circuit in this process to do work, creating an electrical potential across the electrodes.

Fuel processors (also known as fuel reformers) generate a hydrogen-containing gas stream which can be used to supply the fuel cell or generate hydrogen for specialty chemical application or for storage in a hydrogen fuelling station. Fuel processors include reactors that steam reform hydrocarbon feedstocks (e.g., natural gas, LPG) and hydrocarbon derivatives (e.g., alcohols) to produce a process stream enriched in hydrogen. Another viable process for reforming hydrocarbons is the so-called autothermal reforming process, which combines partial oxidation with steam reforming. Other by-products from the reforming of hydrocarbon include carbon monoxide and carbon dioxide. For example, methane is converted to hydrogen, carbon monoxide and carbon dioxide by the three reactions below:

$$CH_4 + H_2O \rightarrow 3H_2 + CO$$

$$CH_4 + 2H_2O \rightarrow 4H_2 + CO_2$$

$$CH_4 + \tfrac{1}{2}O_2 \rightarrow 2H_2 + CO$$

The resulting gas is then reacted in the water-gas shift reactor where the process stream is further enriched in hydrogen by reaction of carbon monoxide with steam in the water-gas shift (WGS) reaction:

$$CO + H_2O \leftrightarrow CO_2 + H_2$$

In fuel processors, the reaction is often conducted in two stages for purposes of heat management and to minimize the outlet CO concentration. The first of two stages is optimized for reaction at higher temperatures (about 350° C.) and is typically conducted using catalysts based on combinations of iron oxide with chromia. The second stage is conducted at lower temperatures (about 200° C.) and is typically conducted using catalysts based on mixtures of copper and zinc materials.

Other catalysts that can be used to conduct the water-gas shift reaction include platinum (Pt)-based catalysts such as platinum on an alumina support or platinum on a cerium oxide containing support. While effective at producing hydrogen using the water-gas shift reaction when operated at temperatures above about 300° C., water-gas shift reaction catalysts also cause the formation of methane ($CH_4$) by catalyzing the reaction of CO with hydrogen as shown below:

$$CO + 3H_2 \rightarrow CH_4 + H_2O.$$

This undesired side reaction sacrifices three moles of hydrogen for each mole of carbon monoxide converted to methane. Methanation can also occur under these conditions with carbon dioxide according to the equation shown below:

$$CO_2 + 4H_2 \rightarrow CH_4 + 2H_2O$$

In this side reaction, four moles of hydrogen are consumed for each mole of carbon dioxide converted to methane. The production of methane during the water-gas shift reaction (referred to herein as "methanation") is a side reaction that consumes hydrogen gas in an exothermic reaction to ultimately reduce the hydrogen yield from the water gas shift reaction. Moreover, the methanation reactions accelerate with increasing catalyst bed temperatures. This property presents a liability, as the exothermic reaction can result in a runaway reaction with carbon dioxide, in addition to carbon monoxide, being methanated. Major hydrogen loss can occur and the catalyst can be damaged by high temperatures. In addition, methane is a greenhouse gas. The fuel cell is advertised as an emission-free energy producer, and release of methane is undesirable. Methane is difficult to combust during normal operating conditions of the fuel cell, so producing an appreciable quantity of methane is environmentally unfavorable.

Pt based catalysts are now the best option for the displacement of base metal catalysts in residential fuel processors and in hydrogen generators for on-site hydrogen generation and low temperature PEM fuel cells. However, aging of the Pt based catalysts is a known disadvantage for this type of catalyst. Because of the aging problems Pt catalysts are widely regarded as unstable in various operations.

Metals such as cobalt (Co), ruthenium (Ru), palladium (Pd), rhodium (Rh) and nickel (Ni) have also been used as WGS catalysts but are normally not too active for the selective WGS reaction and cause methanation of CO to $CH_4$ under typical reaction conditions. In other words, the hydrogen produced by the water gas shift reaction is consumed as it reacts with the CO feed in the presence of such catalysts to yield methane. This methanation reaction activity has limited the utility of metals such as Co, Ru, Pd, Rh and Ni as water gas shift catalysts.

Pt—Re bimetallic catalysts for use in the WGS reaction have recently been suggested. For example, Pt—Re on a ceria-zirconia support was shown to enhance the WGS rate compared with the rate observed with Pt alone supported on ceria-zirconia, "Pt—Re bimetallic supported on $CeO_2$—$ZrO_2$ mixed oxides as water-gas shift catalyst", Choung et al., *Catalysis Today* 99 (2005) 257-262. U.S. Pat. No. 6,777,117 issued Aug. 17, 2004 and U.S. Pat. Pub. No. 2003/0186804 published Oct. 2, 2003 disclose similar Pt—Re WGS catalysts.

A need exists, for operating a Pt—Re bimetallic based water gas shift catalyst under conditions that reduce the aging process of such catalyst and provide a stable condition for the production of effective amounts of hydrogen for use in fuel cells.

SUMMARY OF THE INVENTION

The present invention is directed to a novel process that significantly reduces the aging of a Pt—Re bimetallic water gas shift catalyst. It was surprisingly found that that the stability and prolonged effective operation of a Pt—Re bimetallic water gas shift catalyst depends on 1) CO content of the feed gas, 2) space velocity of the feed gas, 3) Pt content of the catalyst, and 4) temperature. A relatively narrow range of operating conditions have been found that results in greatly reduced aging of the Pt—Re bimetallic catalyst during the water gas shift operation.

Surprisingly, the Pt—Re catalyst operates effectively under certain conditions, but ages continuously at operating conditions outside the inventive range. This is surprising because catalyst aging usually is either dependent on operating temperature or changes linearly with the turn-over frequency of the reactant. In the present invention, aging is greatly reduced under certain conditions including elevated temperature, low space velocity and low to medium CO feed concentration.

It was found that in general, the Pt—Re bimetallic water gas shift catalyst operates stably at 1) low space velocity, 2) high temperature and 3) low CO content of the feed gas at a given Pt concentration on the catalyst. The higher the Pt content (at equal dispersion) of the catalyst, the higher the space velocity can be for stable operation without catalyst aging.

DETAILED DESCRIPTION OF THE INVENTION

Figure 1:
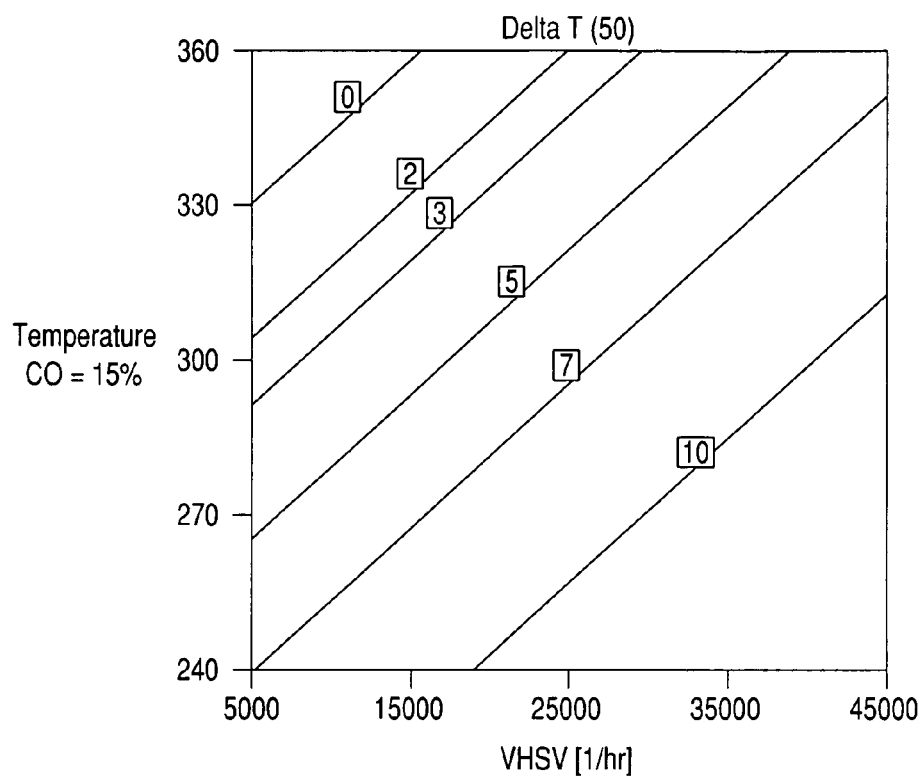
FIG. 1 shows the points of equal stability for a Pt—Re catalyst in dependence on space velocity and temperature at high CO concentration.
Figure 2:
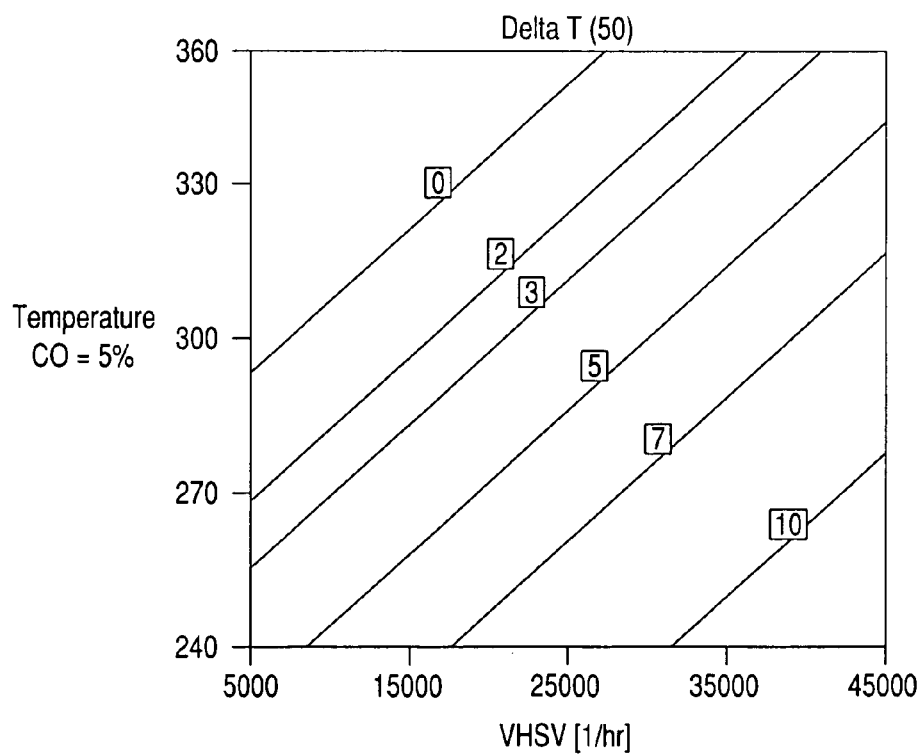
FIG. 2 shows the points of equal stability for a Pt—Re catalyst in dependence on space velocity and temperature at low CO concentration.

The present invention provides a process of using a Pt—Re water gas shift ("WGS") catalyst composition within defined operating conditions that minimize the aging of the catalyst composition.

The catalyst contains at least Pt and Re and, optionally, palladium, rhodium, ruthenium, iridium and osmium. Typically, there is at least 0.1 wt. % of the platinum metal in the catalyst composition in addition to the optional metals. Preferably, there is about 0.5 to 10 wt. %, and, more preferably, about 0.75 to 8 wt. % of platinum metal in the catalyst composition. Platinum metal levels of from 1.0 to 10 wt. % are also exemplified. In general, the weight ratios of Pt:Re will range from about 10:1 to 1:5. Also exemplified are Pt:Re ratios of about 5:1 to 1:1 and, more typically, about 5:1 to 2:1.

In general, the bimetallic Pt—Re catalyst is provided on an inorganic oxide support. Useful inorganic oxide support carriers include high surface area inorganic oxide supports. These inorganic oxide supports include, for example, activated alumina, zirconia, titania, silica and rare earth metal oxides and mixed oxides of same. Particularly useful supports includes zirconia, a mixed oxide of zirconia-ceria or rare earth doped zirconia or zirconia-ceria. In general, the inorganic oxide support will have a specific surface area of at least 10 $m^2/g$. More preferably, the inorganic oxide support has a specific surface area of at least 50 $m^2/g$.

For all embodiments of the present invention, the catalyst is preferably formed by dispersing platinum and rhenium on an inorganic oxide support. The platinum and rhenium are preferably dispersed on the inorganic oxide support by contacting the support with water-soluble or water-dispersible salts of the platinum and rhenium for sufficient time to impregnate the inorganic oxide support, followed by a drying step. The impregnation can be accomplished using incipient wetness impregnation wherein minimal volumes of the metal salt solutions are employed to soak the inorganic oxide support. In other embodiments, the impregnation can be achieved by use of larger proportions of platinum and rhenium metal salt solutions. Useful platinum and rhenium metal salts include, but are not limited to, platinum nitrate, amine-solubilized platinum hydroxide, ammonium perrhenate, perrhenic acid, etc. The support material containing the platinum and rhenium group metal components can be calcined to form the metal or oxides, preferably at a temperature above about 400° C.

The inorganic oxide support may be modified by the addition thereto of rare earth metal oxide. The rare earth metals are represented by Atomic numbers 57-71 of the Periodic Table of Elements. Preferably, the rare earths which may be incorporated into the inorganic oxide support include the oxides of lanthanum, cerium, praseodymium, neodimium, promethium, samarium, europium, and gadolinium. The oxides of yttrium are also useful. The rare earth metal oxide is preferably dispersed on the inorganic oxide support by contacting the inorganic oxide support with a water-soluble or water-dispersable salt of the rare earth metal for sufficient time to impregnate the inorganic oxide support, followed by a drying step. The impregnation can be accomplished using incipient wetness impregnation wherein minimal volumes of the rare earth salt solutions are employed to soak the inorganic oxide support. In other embodiments, the impregnation can be achieved by use of larger proportions of rare earth metal salt solutions. Useful rare earth metal salts include, but are not limited to, the rare earth chlorides, sulfates, nitrates, acetates, etc. Subsequent to drying, the rare earth salt is converted to the oxide by calcination in air at temperatures of above about 300° C. The rare earth oxide, if present, will typically comprise 2 to 20 wt. % relative to the catalyst. Levels of the rare earth oxide of 3 to 15 wt. % are also exemplified.

The Pt—Re bimetallic catalyst may be modified by the addition of a molybdenum catalyst promoter. Such promoter is typically in the form of the oxide, i.e. $MoO_3$. Molybdates, such as $BaMoO_4$, $Ce_2(MoO_4)_3$, $La_2(MoO_4)_3$, $Y_2(MoO_4)_3$ can be used. In general, such promoters, if used, will be present in amounts of about 0.1 to 10 wt. % of the catalyst. Levels of the Mo oxides can also include 1 to 5% by weight of the catalyst.

Optionally, the catalyst comprising an inorganic oxide support, a platinum group metal, and a rhenium metal, can be enhanced by the addition of alkali metal compounds. In particular, it has been found that the addition of compounds of lithium, sodium, potassium, rubidium, and cesium increases initial catalytic activity. In general, the alkali metal component can be added to the catalyst by dispersing the alkali metal compound in water and impregnating the modified inorganic oxide support, drying and calcining in air to yield the alkali metal oxide. The alkali metal compound can be added simultaneously with the platinum impregnation or in a separate step. For incorporation into the catalyst by impregnation, the alkali metal component can be in the form, for example, of the hydroxide, or chloride, nitrate, sulfate, carbonate salts, etc., or the alkali metal salt of lower organic acids such as the alkali metal acetate salt. In general, the amount of the alkali metal component if incorporated into the catalyst as alkali metal, will range from about 0.1 to 15 wt. % relative to the support, with amounts of 0.5 to 10 wt. % also exemplified.

Washcoat compositions, extrudates and tablets of the catalyst are preferably formed from powdered catalyst compositions containing the platinum and rhenium metals. Alternatively, the platinum and rhenium metals may be added after forming the catalyst composition into any of the useful forms.

Washcoat compositions (or "slurries") of the catalyst for deposition on substrates are a particularly useful form of the catalyst composition of this invention. Such washcoat compositions are prepared using methods known in the art. Preferably, the catalyst is ball milled as a suspension using sufficient water to prepare a slurry of a desired concentration. The concentration of the solids in the washcoat slurry can be used as a method to control the thickness of the catalyst coating ultimately deposited on the substrate. For example, increasing the weight percentage of solids in the aqueous slurry will result in a thicker catalytic coat.

It is also generally advantageous to prepare slurries having particles of small particle sizes, e.g., less than 10 µm, to anchor the catalyst on the substrate. Therefore, the particle size distribution of the slurry is typically measured, and milling is continued until the desired particle size has been achieved. Here again, binders such as hydrated forms of alumina, e.g., pseudoboehmite, are optionally included in the slurries to improve adherence of the washcoat to the substrate walls.

The washcoat slurries are deposited on the substrates by methods well-known to those of ordinary skill. Thus, for example, in a typical honeycomb substrate preparation, a layer of the supported Pt—Re catalyst can be prepared by dipping the substrate in a reservoir containing a sufficient volume of the slurry so that the substrate is fully immersed. The coated substrate can be subsequently dried and calcined. Alternatively, the substrate can be coated using a catalyst which only contains Pt and the Re is added after the coating step by dipping of the substrate into a solution of a soluble Re compound.

As mentioned above, the washcoat catalyst can be disposed on substrates to form coated monolith substrates. Although a variety of substrates can be used, the substrate is preferably of the type with one or more monolithic bodies having a plurality of finely divided gas flow passages (channels) extending there through. Preferably, the monolith substrate is of the type having a plurality of fine, parallel gas flow passages extending across the longitudinal axis of the substrate from an inlet or an outlet face, so that the channels are open to fluid flow there through (often referred to as a "honeycomb substrate"). The passages, which are essentially straight from the inlet and outlet of the substrates, are defined by walls on which the catalyst composition can be coated in washcoat compositions so that the gases flowing through the passages contact the catalyst material.

Monolithic, honeycomb substrates are commercially available in various sizes and configurations. The flow passages of the monolithic substrate are thin-walled channels which can be of any suitable cross-sectional shape and size such as trapezoidal, rectangular, square, sinusoidal, hexagonal, oval, circular. Such monolithic substrates may contain up to about 700 or more flow channels ("cells") per square inch of cross section, although far fewer may be used. For example, the substrate can have from about 60 to 600, more usually from about 200 to 400 cells per square inch ("cpsi").

Various types of materials of construction for honeycomb substrates are known. The honeycomb substrate can be made from a variety of materials, including metal or ceramic materials. In some embodiments, the monolith substrate can be made from a ceramic porous material composed of one or more metal oxides, e.g., alumina, alumina-silica, alumina-silica-titania, mullite, cordierite, zirconia, zirconia-ceria, zirconia-spinel, zirconia-mullite, silicon-carbide, and the like. Some non-limiting examples of ceramic monoliths can include those made of: zirconium, barium titanate, porcelain, thorium oxide, magnesium oxide, steatite, boron or silicon carbonates, cordierite-alpha alumina, silicon nitride, spodumene, alumina-silica magnesia, zircon silicate, sillimanite, magnesium silicates, zircon, petalite, alpha alumina and aluminosilicates. One example of a commercially available material for use as the substrate for the present invention is cordierite, which is an alumina-magnesia-silica material.

The metallic monolith substrate can be a honeycomb substrate made of a refractory metal such as a stainless steel or other suitable iron based corrosion resistant alloys (e.g., iron-chromium alloy). Metal monoliths can be produced, for example, from alloys of chromium, aluminum and cobalt, such as those marketed under the trademark KANTHAL, or those produced from alloys of iron, chromium, aluminum and yttrium, marketed under the trademark of FECRALLOY. The metal can also be carbon steel or simple cast iron. Monolith substrates are typically fabricated from such materials by placing a flat and a corrugated metal sheet one over the other and rolling the stacked sheets into a tubular configuration about an axis parallel to the configurations, to provide a cylindrical-shaped body having a plurality of fine, parallel gas flow passages, which can range, typically, from about 200 to about 1,200 per square inch of face area. Heat exchangers, which are typically formed from metallic materials, can also be used as the monolith structures.

The substrate can be made of a ceramic or metal foam. Substrates in the form of foams are well known in the prior art, e.g., see U.S. Pat. No. 3,111,396, herein incorporated by reference.

The catalyst may be in the form of extrudates. The calcined, powdered catalyst containing inorganic oxide support and platinum and rhenium metals are typically mixed with a binder and extruded through a die of the desired shape, dried and calcined. Alternatively, the inorganic oxide support can be extruded, dried and calcined. The calcined extrudate can then be impregnated with the platinum and rhenium metals and other optional components discussed above. Typical useful binders include hydrated forms of alumina (e.g., pseudoboehmite), silica binders, clay binders, zirconia binders and the like. Subsequent calcination yields the desired catalytically active metallic particles on the support.

The present invention relates, in particular, to processes for using the catalysts of the invention. In a preferred embodiment, the catalysts of the invention can be used in processes for producing hydrogen via the water-gas shift reaction within defined operating conditions. For example, the WGS catalysts of the invention can be incorporated in a reactor that is charged with an input gas stream containing carbon monoxide and steam to produce hydrogen and carbon dioxide as products in the output gas stream.

The composition of the input gas stream for the process can vary depending on the source of the reactant carbon monoxide. The process of the invention is particularly effective wherein the carbon monoxide concentration is present in levels up to 20% by volume. Typically, molar excesses of steam are used relative to the amount of carbon monoxide introduced into the input gas stream. Generally, $H_2O:CO$ molar ratios of between 1:1 (i.e., "1.0") and 20:1 (i.e. "20.0") are preferred in the input gas stream, with the higher ratios of the range being particularly preferred for high conversion of carbon monoxide.

In on-site hydrogen generators and/or fuel cell applications of the inventive process, input gas streams typically contain at least 10% by volume of hydrogen in addition to the carbon monoxide and steam. Higher volumes of hydrogen, e.g., greater than 30-50% by volume, are often utilized in fuel cell applications. The input gas stream typically contains 10-25% by volume of carbon dioxide.

In addition to carbon monoxide, carbon dioxide, steam and hydrogen, the input gas stream can contain nitrogen, and minor amounts of olefins, alcohols, aldehydes and/or other hydrocarbons. Preferably, the input gas stream contains not more than 4-5% by volume of hydrocarbons.

Reaction zone pressure is preferably maintained below the dew point pressure of the reaction mixture. It should be recognized that lower or higher reaction zone pressures can be used, such as from atmospheric up to about 500 psig.

Preferably, the water-gas shift reaction process is carried out in a continuous mode with the reactants being passed over the catalyst contained in one or more reaction zones. In general, gaseous hourly space velocities of about 500 to about 50,000 $hr^{-1}$ VHSV measured for a monolithic catalyst on the basis of wet gas under standard conditions are particularly suitable for most fuel cell operations. A useful operating temperature of the water-gas shift process is about 150 to 450° C. A preferred operating range is from 200 to 400° C.

The optimal temperature ranges for these catalysts make it an ideal candidate for incorporation into fuel processor reactors that serve as the "high-temperature" component in water-gas shift reactors. As will be discussed below, an operating window of space velocity and temperature for the Pt—Re catalysts of the invention are chosen with respect to CO feed concentration to greatly reduce the aging of the catalyst. Outside the window of operating parameters, aging of the catalyst results. Counter intuitively, it has been found, in general, that lower space velocities, lower CO concentrations and higher temperatures resulted in greatly reduced aging of the Pt—Re WGS catalysts.

While not being bound by this theory, we believe that the following mechanism can explain the experimental results as found in the examples below. There are two competing processes which determine the stability of the catalyst against sintering of the catalytically active Pt particles, and the concomitant loss of catalytic activity. One process is the formation of a surface bound Pt-carbonyl species through aggregation of CO bound to the Pt surface, which weakens the Pt-support interaction and makes Pt atoms "mobile" on the surface and enables a sintering of Pt particles. The other process is the removal of CO molecules bound to Pt. This latter process consists of catalytic conversion of CO which is bound on the Pt surface to $CO_2$ and desorption of bound CO molecules to the gas phase. This process provides a "cleaning" mechanism for the Pt surface. The balance of these two processes determines whether the catalyst activity remains stable. If the cleaning reaction rate exceeds the deactivation reation rate (CO aggregation) the catalyst operates stably. The reaction rates of the two reactions depend on temperature, space velocity and CO concentration (i.e. flow of CO per unit time).

The higher the CO flow rate (CO concentration and space velocity) per unit Pt surface, the higher the likelihood of formation of Pt-carbonyls and hence sintering of Pt. The higher the temperature, the lower the likelihood that CO binds to the Pt surface (i.e. lower surface coverage) and hence the lower the chance to form a mobile Pt carbonyl species. Also, at higher temperatures, the cleaning mechanism, i.e. the turn-over of CO molecules to $CO_2$ molecules or desorption of CO is faster. Therefore, bound CO is converted or removed before a critical surface concentration for the formation of labile carbonyl species is formed.

If the formation of the surface labile carbonyl is faster than the competing WGS reaction, the catalyst sinters. If the catalytic reaction of steam and CO to form $CO_2$ and $H_2$ dominates, the catalyst is stable. The data displayed in Table 2 below shows that adjusting the reaction conditions can change the relative reaction rates and hence the stability of the catalyst in operation at these conditions. For example, if operated at a space velocity of 15,000 $h^{-1}$ and 15% CO concentration at 360° C., the catalyst operates stably ($\Delta T(50)=-0.6$). However, if the space velocity is increased 3-fold (45,000 $h^{-1}$) at the same temperature and CO concentration, the catalyst ages at a rate of $\Delta T(50)=10°$ C. in 20 hours. Therefore the aging is not linear in CO flux over the catalyst (i.e. 3-times higher at a 3-fold higher space velocity).

More specifically, it has been found through analysis of the experimental results with the software package "Design Expert" (Stat-ease Inc.) that if the following equation is followed, reductions in catalyst aging can be achieved.

$$\Delta T(50)_{20h} = (5.51 + 4.40 \times 10^{-5} \times VHSV - 0.015 \times T + 0.049 \times \% \ CO)^2 - 1.65$$

Wherein:

T is Temperature in degrees C.

(% CO) is the CO content of the dry process gas (without steam) in volume percent.

VHSV is the gas hourly space velocity for a catalyst containing 7.4 g Pt per liter. The term is replaced by [VHSV×(Pt(g/l)/7.4)] for catalysts with different Pt content.

$\Delta T(50)_{20h}$ is the difference of the temperatures of 50% CO conversion, i.e., T (50) aged 20h-T (50) fresh.

In this invention, $\Delta T(50)_{20h}$ values of less than 3 are desired for stable operation of the catalyst. Values of $\Delta T(50)_{20h}$ of $\leq 2$ are particularly useful to greatly reduce aging. The average deviation between the experimental data points the predicted (calculated) delta-T(50) based on the equation is calculated to be about 3.5. Therfore calculated, values of less than 7.0 and ≦5.0 in the equation, could still fall in the desired $T(50)_{20h}$<3 window of operation and therefore fall within the scope of the invention. Please see Table 2 below.

Further, it has been found that reduced aging of a Pt—Re WGS catalyst is achieved at catalyst loadings discussed previously and the following conditions: CO (5 to 15 vol %); VHSV (<20,000 $h^{-1}$×Pt (g/l)/7.4) and T (>330° C.). Also exemplified are the following parameters: CO (5 to 15 vol %) VHSV (8,000-15,000 $h^{-1}$×Pt (g/l)/7.4) and T (360° C). Besides the "high" temperature regime immediately expressed, "low" and "medium" temperature regimes have been found that greatly reduce catalyst aging. For example, the following operating conditions can be used:

Medium: T=280-320° C., CO=10-20%, VHSV×Pt (g/l)/7.4<15000 $h^{-1}$

Low: T=200-250° C., CO=2-6%, VHSV×Pt (g/l)/7.4<2500 $h^{-1}$

Although the water-gas shift catalysts and processes of the invention can be used in any application where hydrogen production is needed, a particularly useful application is in apparatus such as fuel processors that supply hydrogen to fuel cells. As discussed above, these systems typically comprise a series of reactors that convert hydrocarbon fuels (e.g., natural gas, gasoline, fuel oil, liquid petroleum gas, and the like) into hydrogen fuel. The conversions that take place in the reactors include reforming reactions and water gas shift reactions to produce hydrogen. Other reactors and trapping devices can also be included in the apparatus that reduce unwanted components in the hydrogen feed streams (e.g., carbon monoxide and sulfur components), which are ultimately supplied to the fuel cell.

EXAMPLE 1

A WGS catalyst as set forth below was used to test for aging.

Preparation of 2% Re/4% Pt/2% $La_2(MoO_4)_3/ZrO_2:La_2O_3:Gd_2O_3$ Powder

A solution of 1.023 ml of a $La(NO_3)_3$ solution (d=1.74 g/cc; 27 wt. % $La_2O_3$) in 600 ml deionized water was prepared. 50 g of $ZrO2:La2O3:Gd2O3$ powder was added to the solution and stirred for 15 minutes. A solution of 0.79 g of $(NH_4)_2MoO_4$ was added within 30 minutes to the slurry and stirred for additional 30 minutes. 1 M $NH_4OH$ solution was added to the slurry until the pH reached 9. The solids were filtered off and washed twice with 200 ml dilute $NH_4OH$. The washed solids were dried for 8 h at 120° C. and calcined 4 h at 500° C.

50 g of the powder from above were slurried in 500 ml deionized water with stirring. A solution of Pt-ammine salt containing 2.08 g Pt was added dropwise and stirring continued for 30 minutes. Acetic acid was added until the pH reached 6. The slurry was filtered, dried and calcined as above.

10 g of the powder from above were impregnated with a solution of 0.3 g $NH_4ReO_4$ in water to incipient wetness. The powder was dried and calcined as above.

Preparation of Monoliths:

For the preparation of monoliths of the catalyst, the catalyst powder 6% Pt/2% $La_2(MoO_4)_3/ZrO_2:La_2O_3:Gd_2O_3$ was mixed with alumina binder and a slurry prepared. The monolith substrate was dipped in the slurry until the desired weight gain was achieved. The catalyst was dried and calcined at 200° C. for 2 h and 500° C. for 2 h.

The monolith was impregnated with Re by dipping into a solution of $NH_4ReO_4$ to deposit 3% Re calculated as wt. % vs. washcoat. The catalyst was dried and calcined as before.

Figure 3:
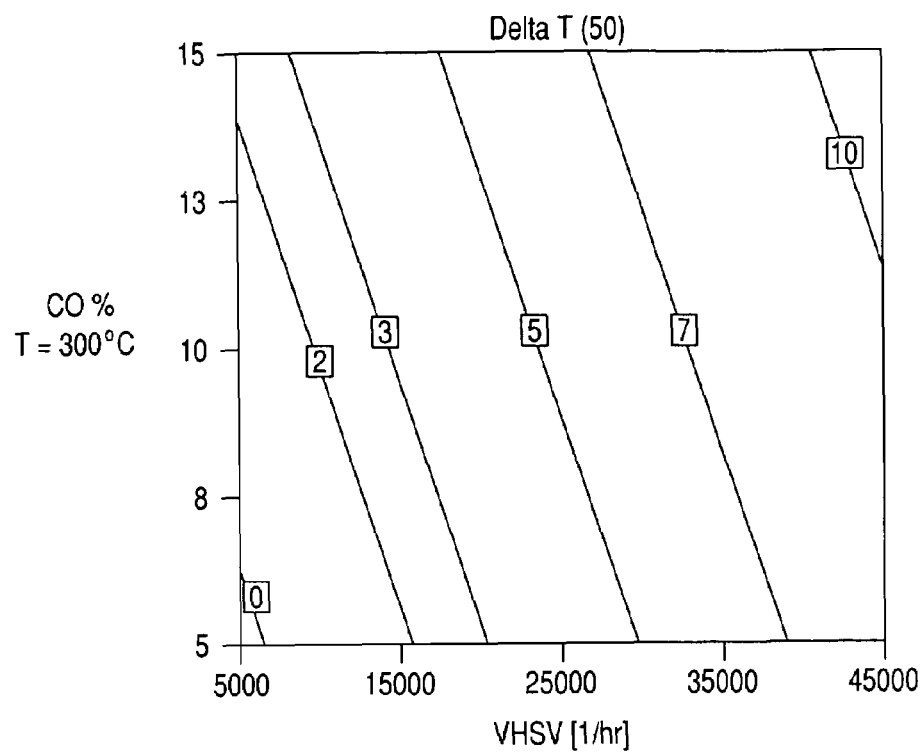
FIG. 3 shows the points of equal stability for a Pt—Re catalyst in dependence on space velocity and CO concentration at medium temperature.
Figure 4:
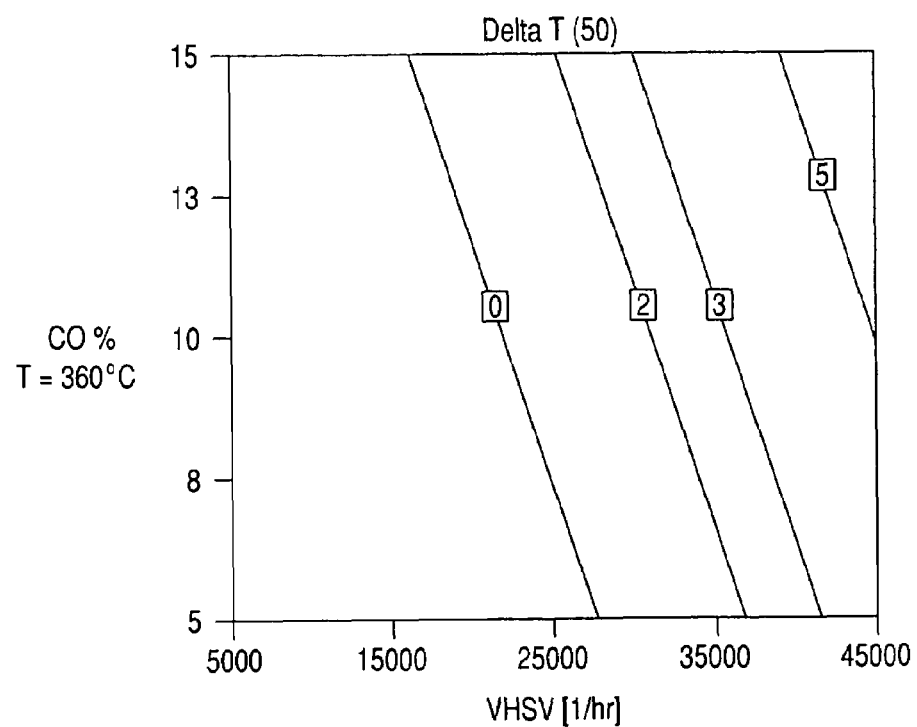
FIG. 4 shows the points of equal stability for a Pt—Re catalyst in dependence on space velocity and CO concentration at high temperature.

Table 1 lists some of the testing conditions which lead to the discovery of the present invention. The CO in the feed gas varied between 5, 10 and 15 vol. %, space velocity of the feed gas (VHSV) varied between 5,000, 15,000, 25,000 and 45,000 $h^{-1}$ (on a monolith basis), and temperatures varied between 240, 300 and 360° C. All experiments were performed with catalysts containing 7.4 g/liter. The experiments were analyzed using the software package "Design Expert" (Stat-ease Inc.) to fit the experimental results to a polynomial equation. The contour plots shown in FIGS. 1-4 show points of equal delta T(50). For example, all points on the line labeled "2" have a delta $T(50)_{20h}$ of 2° C. The desired operating window would be in the upper left triangle for the first two plots (FIGS. 1 and 2) (above and left of the "2" contour) and in the lower left part (below and left of the "2" contour) in the third and fourth plots (FIGS. 3 and 4). However, because the average deviation using this equation vs. the observed number is about 3.5, calculated numbers as high as 7.0 may lead to stable operation of the catalyst with a resulting observed ΔT $(50)_{20h}$<3. FIG. 1 is a plot at a CO concentration of 15%, FIG. 2 at a CO concentration of 5%. FIG. 3 is a plot at an inlet temperature of 300° C., FIG. 4 for an inlet temperature of 360° C.

TABLE 1

Matrix of operating conditions tested for Pt—Re bimetallic WGS catalysts

|  | Low | Medium | high |
| --- | --- | --- | --- |
| Temperature [° C.] | 240 | 300 | 360 |
| Monolith VHSV [$h^{-1}$] | 5,000 | 15,000/25,000 | 45,000 |
| CO content [%, dry gas] | 5 | 10 | 15 |

The activity or aging of each catalyst was measured before and after a 20 hour aging segment, after reduction of the catalyst at 350° C. in the reformate mixture, at the specified conditions by raising the temperature from 160-200° C. to 350° C. to measure the temperature of 50% CO conversion. The difference of the temperatures of 50% CO conversion $T(50)_{aged\ 20h}$-$T(50)_{fresh}$ is reported as Δ $T(50)_{20h}$. Apparently, the smaller the value of Δ $T(50)_{20h}$, the less of aging experienced in the WSG catalysts. The exact reason for the reduction of aging process of the Pt—Re bimetallic catalyst has not been ascertained. However, it is speculated that the aging mechanism involves mobilization of Pt on the catalyst surface by CO, which leads to sintering of Pt particles. The aging is therefore irreversible and catalyst activity does not recover.

The experimental and calculated results of aging are listed in Table 2. Powder samples containing 6% Pt were found to give equivalent aging results with 4% Pt powder samples when measured at 1.5 times the space velocity of the 4% Pt powder.

The Pt loading on a monolith was 7.4 g/liter. The powders were run at "monolith equivalent" space velocities, i.e., the powder was run at a space velocity equivalent to running a monlith coated with this powder. In other words, the space velocity on a powder basis is about 5.4 times higher than the space velocity listed in Table 2 for 4% Pt powder and about 8.1 times higher higher for 6% Pt powder. For example, a space velocity of 5000 $h^{-1}$ on a monolith basis translates into a space velocity of about 27,000 ml/g·hour on a 4% Pt powder basis and 40,500 ml/g·hour on a 6% Pt powder basis. The space velocity is based on wet gas flow (including steam). The CO concentration is reported as volume % in the dry gas (whithout steam present).

TABLE 2

Results of aging

| catalyst | VHSV* [monolith h$^{-1}$] | Temp. [C.] | CO conc. [dry vol. %] | delta-T(50) experimental | Calculated delta T(50) | |
|---|---|---|---|---|---|---|
| 4% Pt powder | 5000 | 360 | 5 | −1.5 | 1.8 | Minimal deactivation |
| 4% Pt powder | 5000 | 300 | 15 | −1.25 | 5.0 | |
| 4% Pt powder | 15000 | 360 | 15 | −0.6 | 3.5 | |
| 4% Pt powder | 5000 | 360 | 15 | −0.2 | 2.5 | |
| 4% Pt powder | 15000 | 300 | 5 | −0.01 | 4.9 | |
| 4% Pt powder | 45000 | 360 | 5 | 0 | 6.5 | |
| 4% Pt powder | 5000 | 240 | 5 | 0 | 6.8 | |
| 4% Pt powder | 15000 | 300 | 15 | 0 | 6.8 | |
| 4% Pt powder | 5000 | 300 | 5 | 0.65 | 3.5 | |
| 4% Pt powder | 5000 | 300 | 15 | 0.8 | 5.0 | |
| 6% Pt monolith | 5000 | 300 | 10 | 1 | 4.2 | |
| 4% Pt powder | 5000 | 300 | 5 | 1.2 | 3.5 | |
| 4% Pt powder | 25000 | 300 | 10 | 2 | 7.8 | Some instability |
| 6% Pt monolith | 25000 | 300 | 15 | 3 | 9.0 | |
| 6% Pt monolith | 25000 | 300 | 5 | 4 | 6.6 | |
| 6% Pt monolith | 25000 | 300 | 10 | 5 | 7.8 | |
| 6% Pt monolith | 25000 | 300 | 10 | 5 | 7.8 | |
| 6% Pt monolith | 45000 | 300 | 10 | 5 | 13.0 | |
| 4% Pt powder | 25000 | 300 | 10 | 5 | 7.8 | |
| 6% Pt monolith | 25000 | 360 | 10 | 6 | 4.1 | |
| 4% Pt powder | 25000 | 300 | 10 | 6 | 7.8 | Most deactivation |
| 6% Pt monolith | 25000 | 300 | 10 | 7 | 7.8 | |
| 4% Pt powder | 45000 | 300 | 5 | 8 | 11.4 | |
| 6% Pt monolith | 25000 | 240 | 10 | 10 | 13.2 | |
| 4% Pt powder | 45000 | 360 | 15 | 10 | 8.8 | |
| 4% Pt powder | 5000 | 240 | 15 | 10 | 9.3 | |
| 4% Pt powder | 15000 | 240 | 5 | 11 | 9.0 | |
| 4% Pt powder | 15000 | 240 | 15 | 12 | 11.9 | |
| 4% Pt powder | 45000 | 300 | 15 | 13 | 14.7 | |
| 4% Pt powder | 45000 | 240 | 5 | 14.5 | 18.0 | |
| 4% Pt powder | 45000 | 240 | 15 | 18 | 22.2 | |

*VHSV is calculated based on a monolith containing 7.4 g/liter of Pt

Without further elaboration, it is believed that one skilled in the art can, using the preceding description, can utilize the present invention to its fullest extent.

We claim:

1. A process for generating hydrogen by the water-gas shift reaction in the presence of a Pt—Re based water-gas shift catalyst, comprising operating the water-gas shift reaction at
   a temperature of about 150 to 450° C.;
   a feed gas comprising up to about 20 vol % CO and steam; a gas space velocity, of the feed gas, at about 4500 to 50,000 h$^{-1}$, and reducing catalyst aging by controlling temperature, vol % CO, gas space velocity so as to meet the following formula:

$$\Delta T(50)_{20h} = (5.51 + 4.40 \times 10^{-5}[VHSV \times Pt(g/l)/7.4] - 0.015 \times T + 0.049 \times \% \, CO)^2 - 1.65$$

wherein T is Temperature in degrees C.
   (% CO) is the CO content of the dry process gas (without steam) in volume percent,
   VHSV is the gas hourly space velocity for a catalyst containing 7.4 g Pt per liter,
   $\Delta T(50)_{20h}$ is the difference of the temperatures at 50% CO conversion, i.e.,
   $\Delta T(50)$ aged 20 hours-T(50) fresh, and
   $\Delta T(50)_{20h}$ is less than 7.0.

2. The process of claim 1, wherein the temperature is 200-400° C.

3. The process of claim 1, wherein the gas space velocity of the feed gas is less than about 20,000 h$^{-1}$×Pt(g/l)/7.4.

4. The process of claim 1, wherein the gas space velocity of the feed gas is about 8,000-15,000 h$^{-1}$×Pt(g/l)/7.4.

5. The process of claim 1, wherein the temperature is greater than 330° C.

6. The process of claim 1, wherein the Pt—Re based catalyst comprises at least one rare earth metal.

7. The process of claim 1, wherein the feed gas comprises about 5-15 vol % CO.

8. The process of claim 1, wherein the catalyst includes a promoter.

9. The process of claim 8, wherein the promoter contains Mo.

10. The process of claim 1, wherein the amount of Pt is 0.1 to 10 wt % of the catalyst.

11. The process of claim 1, wherein $\Delta T(50)_{20h}$ is $\leq 5.0$.

12. The process of claim 10, wherein the weight ratio of Pt:Re is from about 10:1 to 1:5.

13. The process of claim 12, wherein the weight ratio of Pt:Re is about 5:1 to 1:1.

14. The process of claim 12, wherein the weight ratio of Pt:Re is about 5:1 to 2:1.

15. A process for generating hydrogen by the water-gas shift reaction in the presence of a Pt—Re based water-gas shift catalyst, comprising operating the water-gas shift reaction at a temperature of about <330° C.; a feed gas comprising up to about 20 vol % CO and steam; a gas space velocity VHSV, of the feed gas, of less than about 20,000 h$^{-1}$×Pt(g/l)/7.4.

16. The process of claim 15, wherein the gas space velocity VHSV of the feed gas is about 8,000-15,000 h$^{-1}$×Pt(g/l)/7.4.

17. The process of claim 15, wherein said catalyst contains 0.1 to 10 wt % Pt and the weight ratio of Pt:Re is from about 10:1 to 1:5.

18. The process of claim 17, wherein the weight ratio of Pt:Re is about 5:1 to 2:1.

19. A process for generating hydrogen by the water-gas shift reaction in the presence of a Pt—Re based water-gas shift catalyst, comprising operating the water-gas shift reaction at a temperature of about 280-320° C.; a feed gas comprising about 10-20 vol % CO and steam; a gas space velocity VHSV, of the feed gas, of less than about 15,000 $h^{-1} \times Pt(g/l)/7.4$.

20. A process for generating hydrogen by the water-gas shift reaction in the presence of a Pt—Re based water-gas shift catalyst, comprising operating the water-gas shift reaction at a temperature of about 200-250° C.; a feed gas comprising about 2-6 vol % CO and steam; a gas space velocity VHSV, of the feed gas, of less than about 2,500 $h^{-1} \times Pt(g/l)/7.4$.

* * * * *